United States Patent
Cravener et al.

(10) Patent No.: US 12,320,392 B2
(45) Date of Patent: Jun. 3, 2025

(54) CLUTCHED CENTRIFUGAL FORCE BEARING

(71) Applicant: Textron Innovations Inc., Providence, RI (US)

(72) Inventors: Kyle Cravener, Arlington, TX (US); Andrew Harloff, Fort Worth, TX (US); Andrew Maresh, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 127 days.

(21) Appl. No.: 18/178,781

(22) Filed: Mar. 6, 2023

(65) Prior Publication Data

US 2024/0301918 A1 Sep. 12, 2024

(51) Int. Cl.
| | | |
|---|---|---|
| *F16C 41/00* | (2006.01) | |
| *B64C 11/06* | (2006.01) | |
| *B64C 29/00* | (2006.01) | |
| *F16C 27/02* | (2006.01) | |

(52) U.S. Cl.
CPC ............ *F16C 41/001* (2013.01); *F16C 27/02* (2013.01); *B64C 11/06* (2013.01); *B64C 29/0033* (2013.01); *F16C 2326/43* (2013.01)

(58) Field of Classification Search
CPC ..... B64C 11/06; B64C 29/0033; F16C 27/02; F16C 41/001; F16C 2361/43; F16C 2326/43; F16C 2208/10
USPC .... 416/134 R, 134 A, 131, 136, 142, 87, 89, 416/135, 141, 138, 169 R, 143
See application file for complete search history.

(56) References Cited

U.S. PATENT DOCUMENTS

| | | | | | |
|---|---|---|---|---|---|
| 2,164,485 | A | * | 7/1939 | Yantis | F16D 7/02 416/169 R |
| 3,106,965 | A | * | 10/1963 | Gorndt | B64C 27/35 416/134 A |
| 3,111,172 | A | * | 11/1963 | Gorndt | B64C 27/35 416/135 |
| 3,225,876 | A | * | 12/1965 | Dison | B64D 35/00 416/169 R |
| 3,228,673 | A | * | 1/1966 | Hinks | F16C 33/24 416/134 A |
| 3,297,094 | A | * | 1/1967 | Kisovec | B64C 27/28 416/89 |
| 3,404,852 | A | * | 10/1968 | Sambell | B64C 29/0033 416/142 |
| 3,515,500 | A | * | 6/1970 | Nachod | B64C 29/0033 244/12.3 |

(Continued)

*Primary Examiner* — Courtney D Heinle
*Assistant Examiner* — Ryan C Clark
(74) *Attorney, Agent, or Firm* — Lightfoot & Alford PLLC

(57) ABSTRACT

An elastomeric bearing has a first end interface, a second end interface, an activation element disposed between the first end interface and the second end interface, and a clutch component disposed between the activation element and the second end interface. A method of operating an elastomeric bearing includes providing a first end interface, providing a second end interface, providing an activation component between the first end interface and the second end interface, providing a clutch component between the activation component and the second end interface, and rotating the first end interface relative to the second interface to cause rotation of the clutch component relative to the second end interface.

17 Claims, 11 Drawing Sheets

(56) References Cited

U.S. PATENT DOCUMENTS

| | | | | |
|---|---|---|---|---|
| 3,592,412 A * | 7/1971 | Glatfelter | ............ | B64C 29/0033 |
| | | | | 416/142 |
| 3,764,230 A * | 10/1973 | Rybicki | ................ | B64C 27/32 |
| | | | | 416/134 A |
| 3,782,854 A * | 1/1974 | Rybicki | ................ | B64C 27/32 |
| | | | | 416/134 A |
| 3,790,302 A * | 2/1974 | Pascher | ................ | B64C 27/32 |
| | | | | 416/102 |
| 3,829,239 A * | 8/1974 | Rybicki | ................ | B64C 27/35 |
| | | | | 416/134 A |
| 4,142,833 A * | 3/1979 | Rybicki | ................ | F16F 1/393 |
| | | | | 416/134 A |
| 4,251,187 A * | 2/1981 | Hollrock | ................ | B64C 27/35 |
| | | | | 416/134 A |
| 4,306,836 A * | 12/1981 | Mayerjak | ................ | B64C 27/35 |
| | | | | 416/134 A |
| 4,373,862 A * | 2/1983 | Ferris | ................ | B64C 27/48 |
| | | | | 416/61 |
| 5,085,315 A * | 2/1992 | Sambell | ................ | B64C 27/30 |
| | | | | 244/6 |
| 5,286,166 A * | 2/1994 | Steward | ................ | B63H 3/008 |
| | | | | 416/89 |
| 6,045,328 A * | 4/2000 | Jones | ................ | F16F 13/105 |
| | | | | 267/141.1 |
| 6,287,076 B1 * | 9/2001 | Mouille | ................ | B64C 27/45 |
| | | | | 416/134 A |
| 8,632,062 B2 * | 1/2014 | James | ................ | B64C 27/35 |
| | | | | 267/141.1 |
| 11,105,381 B2 * | 8/2021 | Kaiser | ................ | F16C 33/22 |
| 2010/0230529 A1 * | 9/2010 | Stamps | ................ | F16F 1/40 |
| | | | | 244/17.11 |
| 2012/0257847 A1 * | 10/2012 | Allred | ................ | F16F 1/41 |
| | | | | 29/898.04 |
| 2013/0175384 A1 * | 7/2013 | Jarrett | ................ | B64C 27/322 |
| | | | | 29/889.6 |
| 2015/0239555 A1 * | 8/2015 | Foskey | ................ | B64C 11/04 |
| | | | | 416/134 A |
| 2017/0334549 A1 * | 11/2017 | Hinks | ................ | F03D 7/0224 |
| 2018/0238430 A1 * | 8/2018 | Eck | ................ | F16H 55/563 |
| 2019/0300164 A1 * | 10/2019 | Maresh | ................ | F16C 17/02 |
| 2020/0148332 A1 * | 5/2020 | Foskey | ................ | B64C 11/20 |
| 2022/0063797 A1 * | 3/2022 | Baskin | ................ | B64C 27/52 |

* cited by examiner

CLUTCHED CENTRIFUGAL FORCE BEARING

STATEMENT REGARDING FEDERALLY SPONSORED RESEARCH OR DEVELOPMENT

Not applicable.

BACKGROUND

Centrifugal forces and feathering motions experienced by the blade of a rotorcraft are managed by discrete bearings. Some bearings are provided with a clutching action, such as surfaces intended to allow angular relative sliding. However, an increased friction of the sliding surfaces or weakened elastomers of the bearing can cause the clutching action to not activate as desired. Accordingly, the elastomeric material of the bearing can be repeatedly and undesirably heavily loaded in torsion, leading to premature failure of the bearing.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above,""below,""upper,""lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
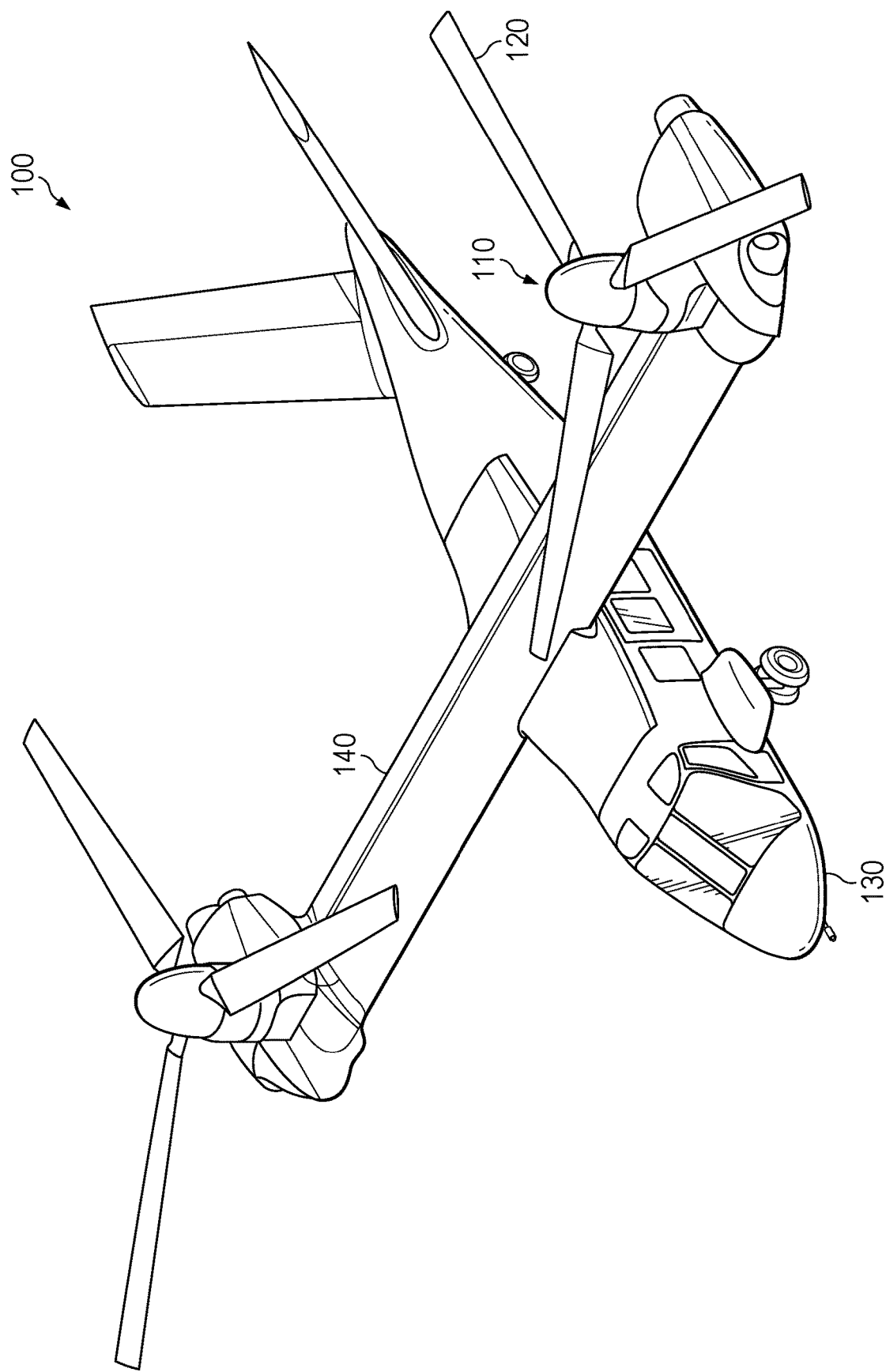
FIG. 1 is a rotorcraft comprising an elastomeric bearing assembly according to an embodiment of this disclosure.

FIG. 1 shows a rotorcraft 100 according to one example embodiment. Rotorcraft 100 features one or more rotor systems 110, a fuselage 130, and a wing 140. Rotor system 110 can include blades 120, a control system, and a pitch horn 160 for selectively controlling the pitch of each blade 120 to control direction, thrust, and lift of rotorcraft 100. In the example of FIG. 1, rotorcraft 100 represents a tiltrotor aircraft, and rotor system 110 features rotatable nacelles. In this example, the position of the nacelles operate rotorcraft 100 in both helicopter and airplane modes. In a further mode of operation, rotorcraft 100 can operate in a jet mode in which nacelles remain in the airplane mode position, but rotors are stopped, blades 120 are folded aft, and forward propulsion relies on gaseous output from engines. Fuselage 130 represents the main body of rotorcraft 100 and can be coupled to one or more rotor systems 110 (e.g., via wing 140) such that rotor system 110 can provide thrust to move fuselage 130 through the air. Wing 140 can also generate lift during forward flight.

Figure 2:
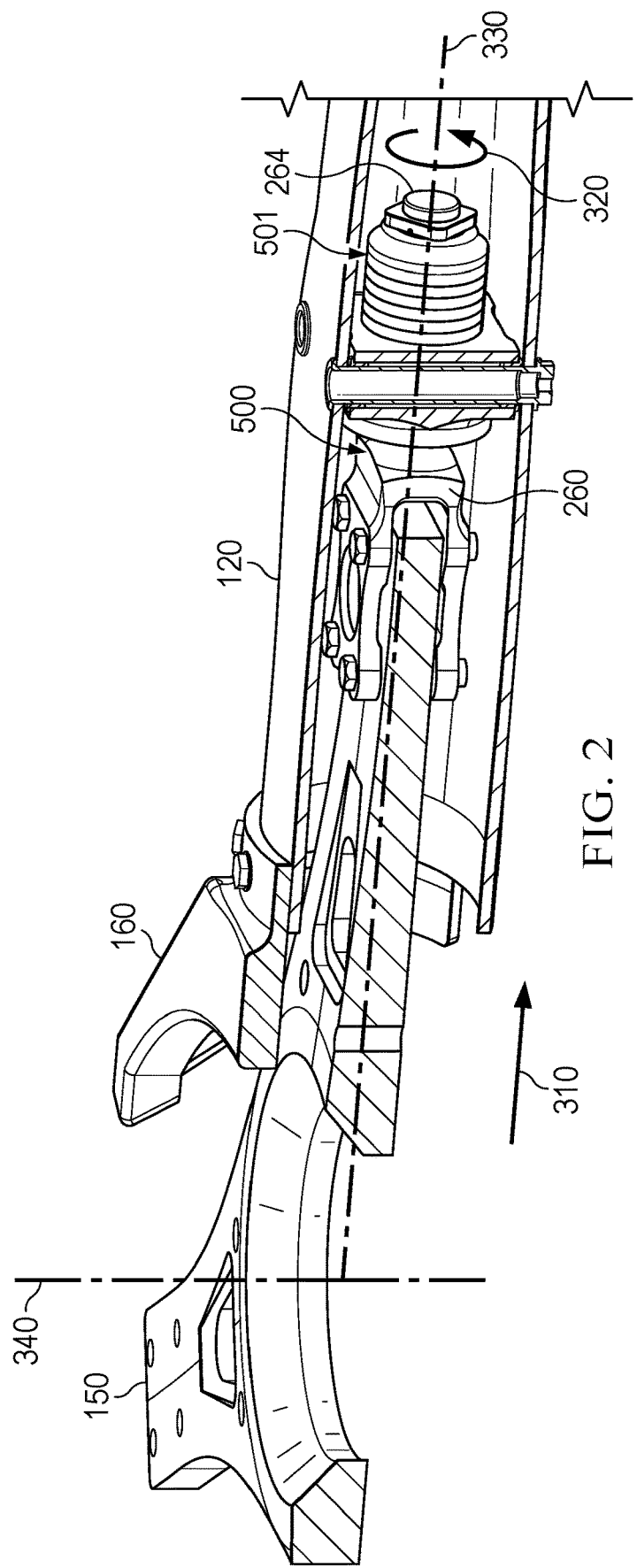
FIG. 2 is an oblique section view of a rotor system of the rotorcraft of FIG. 1.

Referring now to FIG. 2, a propulsion system provides torque to a rotor mast (not shown). Yoke 150 is coupled to the rotor mast such that rotation of the rotor mast causes yoke 150 and rotor blade 120 to rotate about the rotor mast axis 340 of rotation. Each yoke 150 further includes at least one elastomeric bearing assembly 501 for receiving and coupling to each rotor blade 120. Elastomeric bearing assembly 501 can be configured to transmit and react a plurality of dynamic forces, such as centrifugal force 310.

Figure 3:
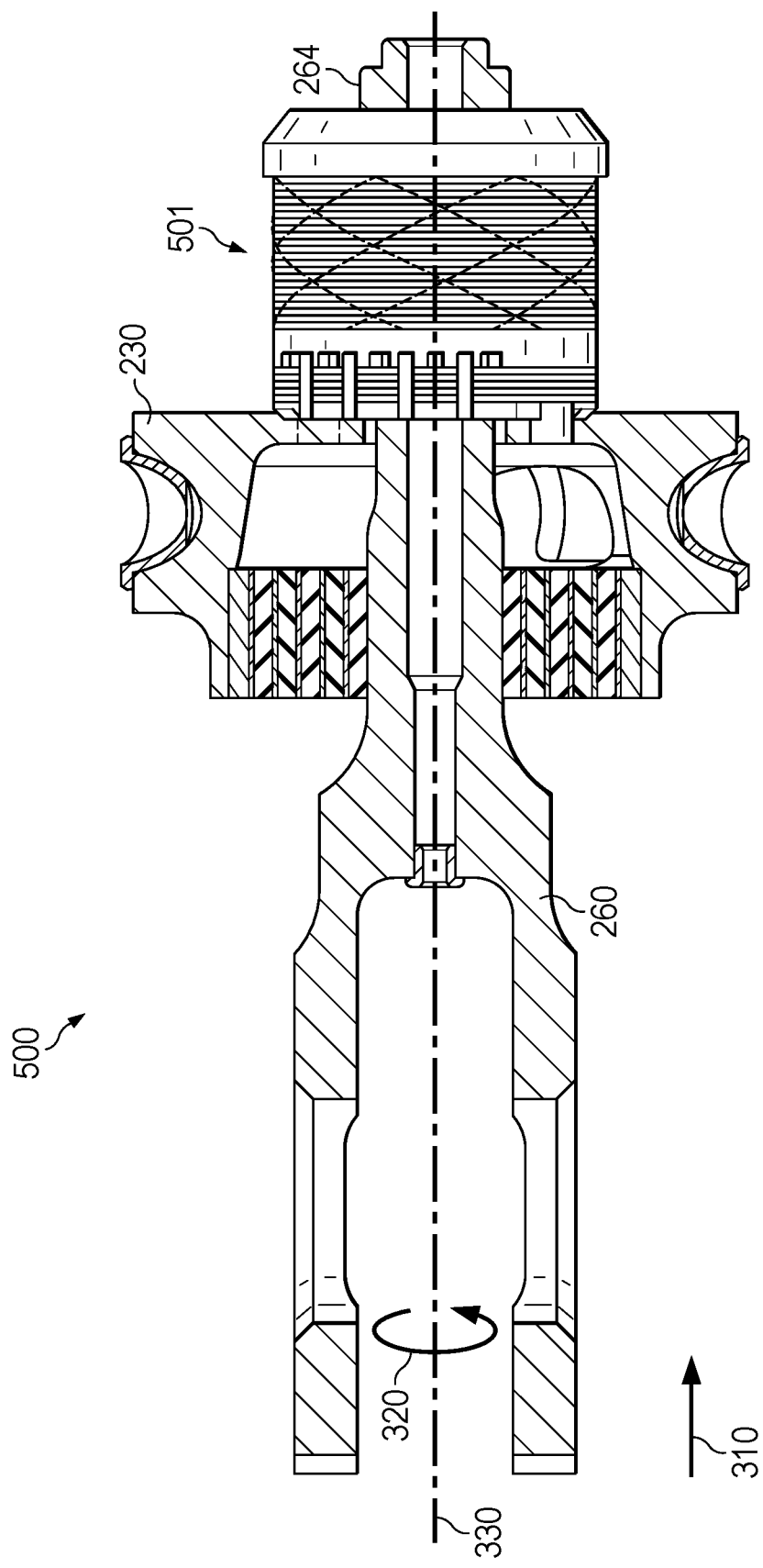
FIG. 3 is a side section view of an elastomeric bearing assembly of the rotor system of FIG. 2.

Referring now to FIG. 3, an elastomeric bearing assembly 501 is shown. Assembly 501 comprises an elastomeric bearing 501. Assembly 501 comprises a spindle 260 having an outboard portion 264 and a bearing housing 230 carried by the spindle. In this embodiment, the bearing 501 is captured between housing 230 and an outboard portion 264 of the spindle 260.

Figure 4:
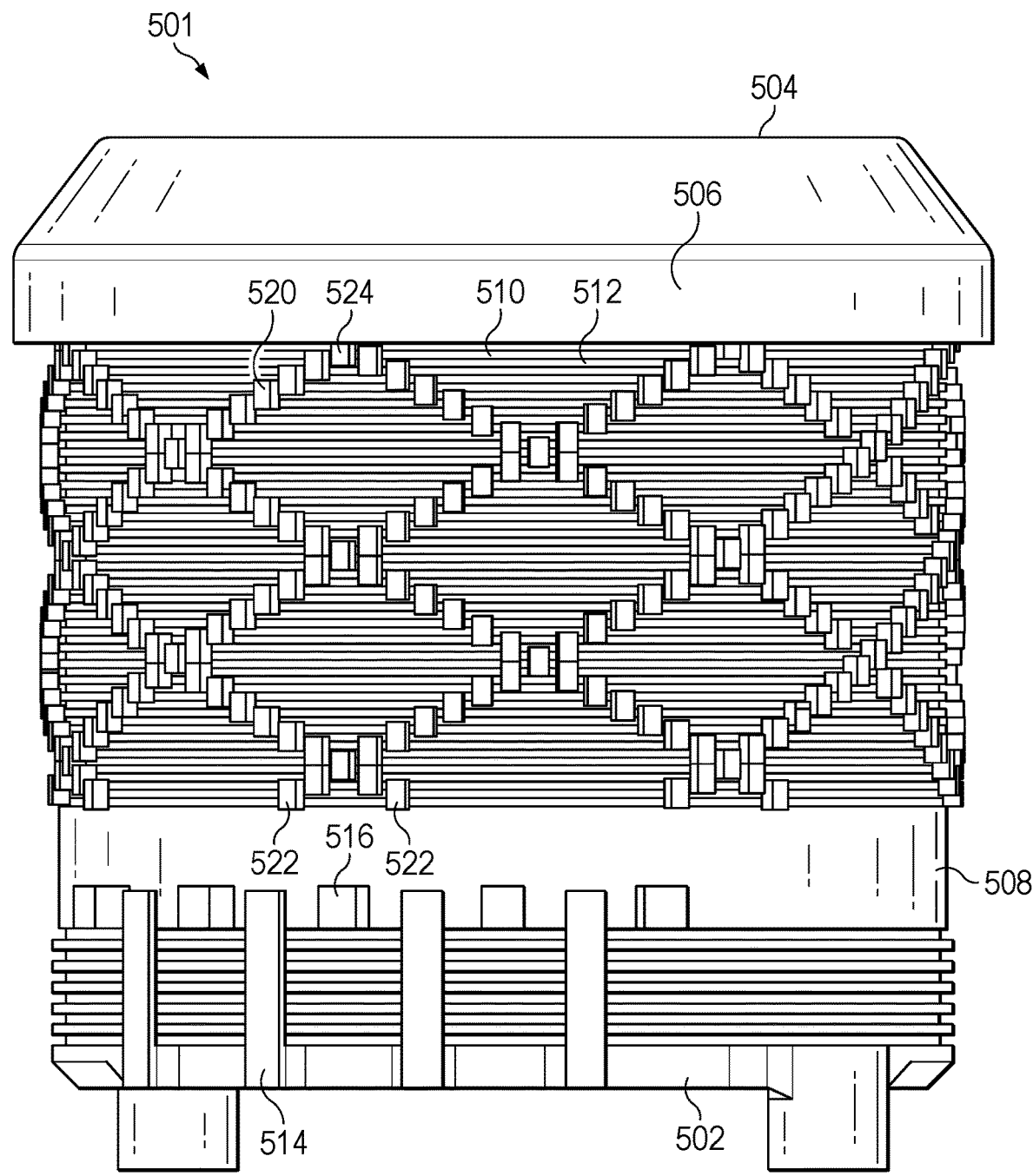
FIG. 4 is a side view of the elastomeric bearing of FIG. 1 in an unengaged configuration.
Figure 5:
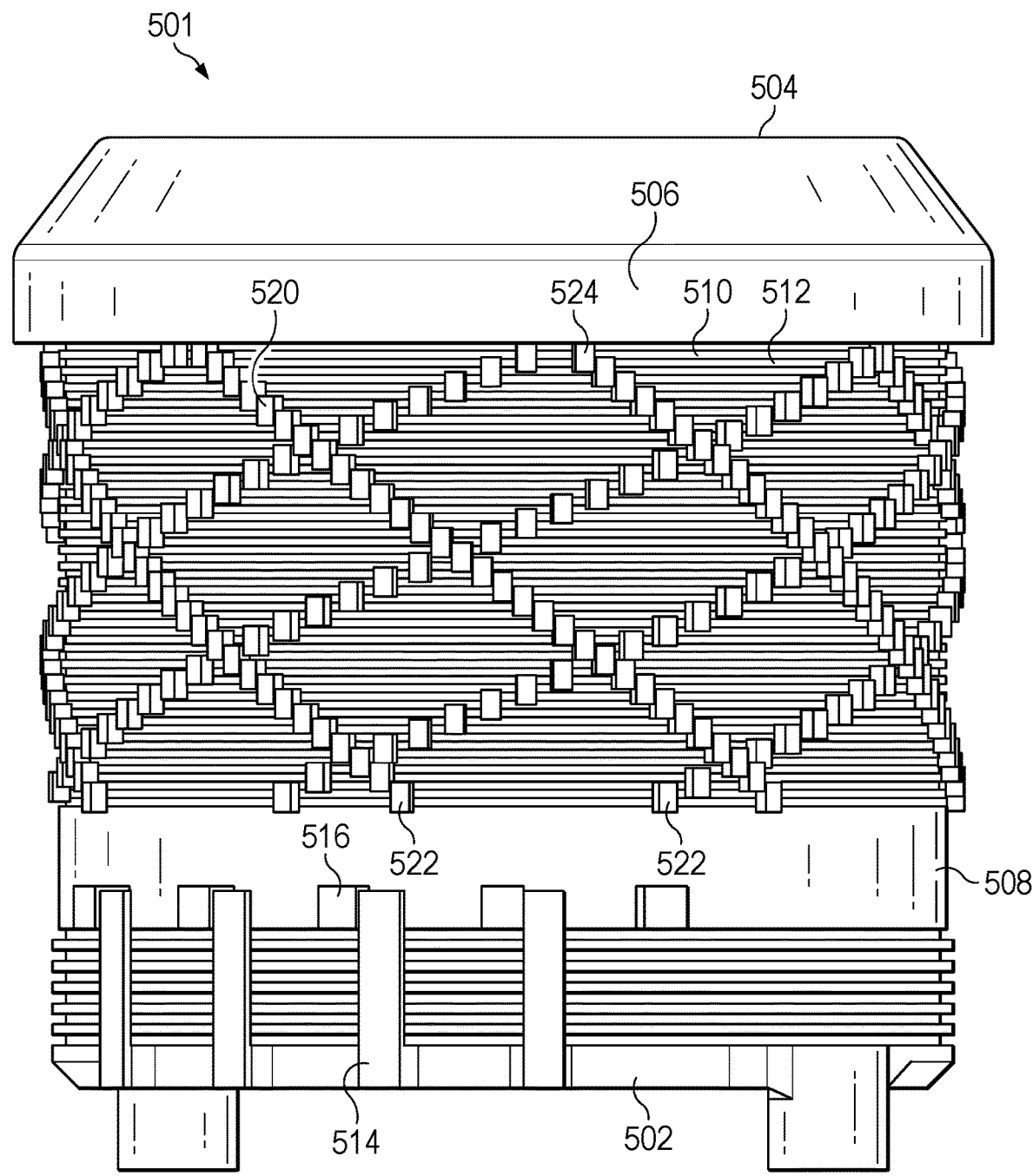
FIG. 5 is a side view of the elastomeric bearing of FIG. 1 in a clockwise engaged configuration.
Figure 6:
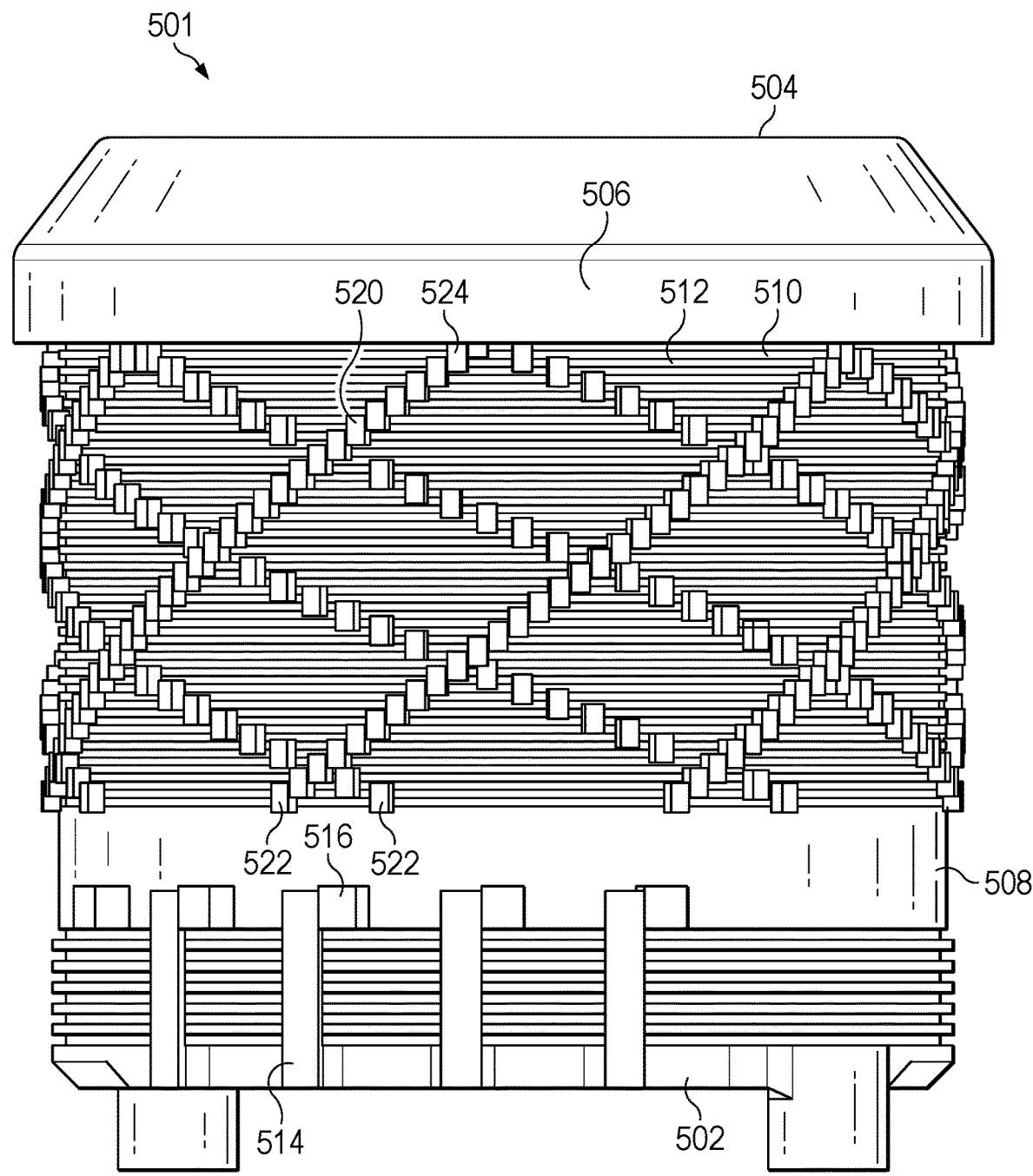
FIG. 6 is a side view of the elastomeric bearing of FIG. 1 in a counter-clockwise engaged configuration.

Referring now to FIGS. 4-6, bearing 501 comprises an inboard interface 502 configured for being fixed to housing 230. Bearing 501 further comprise an outboard interface 504 that remains fixed in angular position relative to the inboard interface 502. Adjacent to the outboard interface 504 is a clutch component 506 configured to selectively rotate relative to the outboard interface 504. The interfacing surfaces of the outboard interface 504 and the clutch component 506 are complementary and configured to enable low friction relative rotation of the clutch component 506 relative to the outboard interface. The bearing 501 further comprises an activation element 508 and shims 510. The activation element 508 is connected to the inboard interface 502 by a stack of the shims 510 and elastomeric elements 512. Similarly, the activation element 508 is connected to the clutch component 506 by a stack of shims 510 and elastomeric element 512.

In this embodiment, inboard interface 502 carries longitudinally extending tabs 514 and activation element 508 carries radially extending stops 516. The tabs 514 extend longitudinally so that they are disposed angularly between adjacent stops 516. Further shims 510 that are disposed between the clutch component 506 and the activation element 508 comprise teeth 520 that extend longitudinally a sufficient distance to at least partially longitudinally overlap the teeth 520 of inboard and outboard adjacent shims 510. Similarly, activation element 508 comprises tooth activators 522 that longitudinally overlap teeth 520 of the immediately adjacent shim 510 on the outboard end of the activation element 508.

In operation, with the bearing 501 in significant compression, and assuming a substantially evenly distributed amount of torsional deflection of each elastomeric element 512, the inboard interface 502, the activation element 508, and the shims 510 can all rotate together in response to torque applied to the bearing 501. However, after sufficient torsional loading of the bearing, the inboard interface 502 and the activation element 508 can begin to rotate at different rates. Accordingly, the tabs 514 can begin to angularly approach and eventually contact adjacent stops 516 of the activation element. With continued torsional loading, any further angular rotation of the inboard interface 502 becomes lockstep with the activation element 508 since the tabs 514 are in contact with and forcing rotation of the stops 516 of the activation element.

With continued rotation of the inboard interface 502 and activation element 508, the tooth activators 522 of the activation element 508 can come into contact with teeth 520 and begin forcing rotation of the shims 510. In some cases where loading of the elastomeric element is substantially evenly distributed longitudinally, most of the adjacent teeth 522 will come into contact with each other within a small amount of continued angular rotation. Ultimately, because the clutch component 506 carries clutch teeth 524 that longitudinally overlap teeth 520 of adjacent shims 510, a rigid torsional force path is formed between the inboard interface 502 and the clutch component 506, thereby forcing rotation of the clutch component 506 relative to the angularly fixed outboard element 504. Notably, the angular offsets between angular engagements of the various element is selected so that a rigid torsional force path is obtained to force clutching movement prior to loading the elastomeric elements 512 in a manner that can cause damage.

The above-described action of selectively creating a rigid torsional force path between the inboard interface 502 and the clutch component 506 can ensure that the clutching action is utilized while keeping the elastomeric components within safe operating ranges. In some embodiments, characteristics of the elastomeric elements between the inboard interface 502 and the activation element 508 are different from the characteristics of the elastomeric elements between the activation element 508 and the clutch component 506. Benefits of this arrangement include allowing for longitudinally shorter bearing length as compared to conventional approached and further provides for a tiered force profile. It will be appreciated that in alternative embodiments, bearings can be substantially similar to bearing 501 but comprise no activation element 508. In such embodiments, all shims can be cylindrical shims while still allowing inboard interface type elements to clutch component, thereby causing the friction clutch to actuate.

Figure 7:
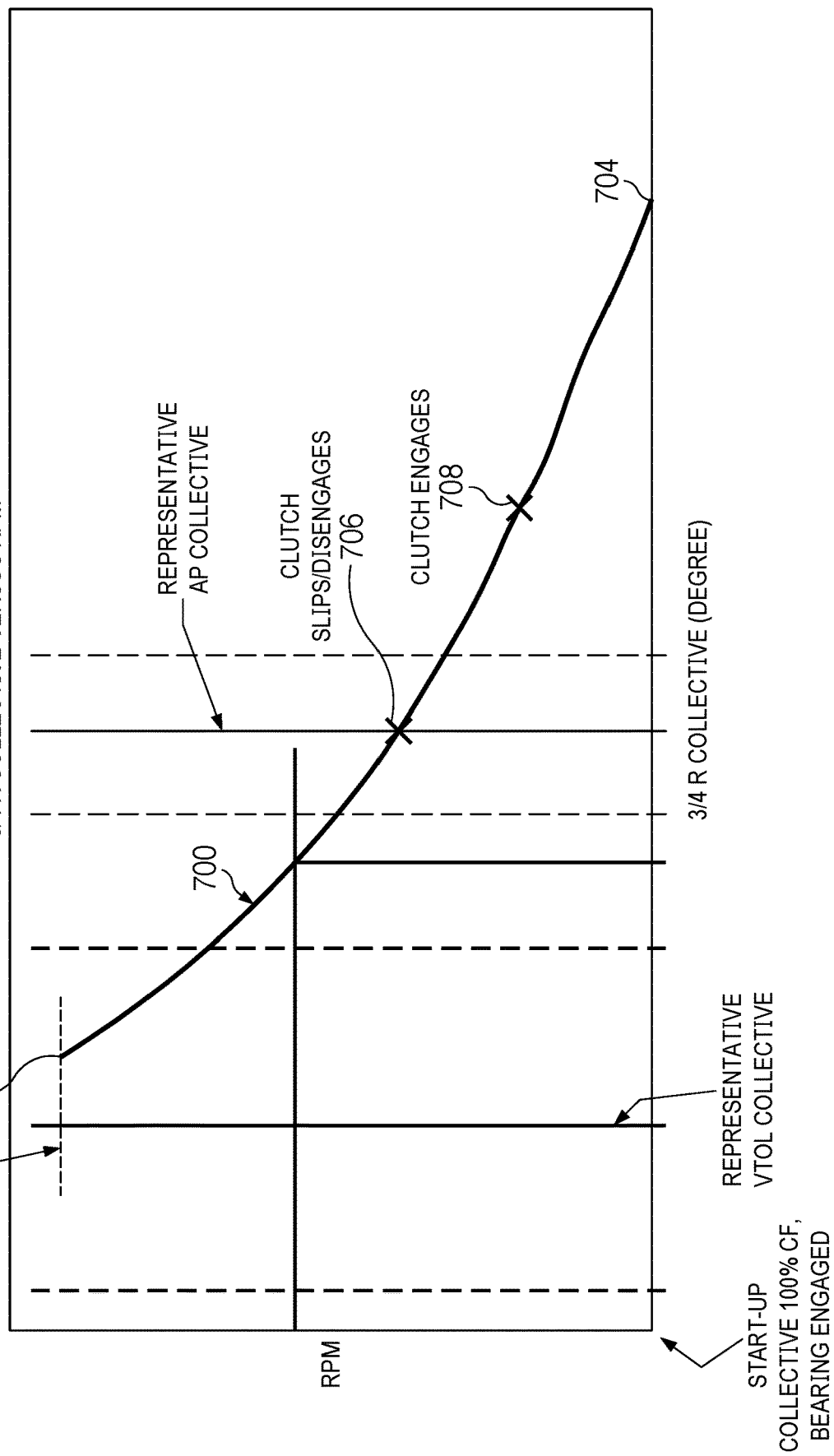
FIG. 7 is a chart showing where on a degrees vs. RPM curve a clutch of the elastomeric bearing of FIG. 1 engages.

Referring now to FIG. 7, a chart showing when clutching action occurs along a curve of collective blade angle versus RPM, where higher RPM is indicative of higher compressive longitudinal force applied to bearing 501. In some embodiments, operation of rotorcraft 100 in transition from helicopter mode to airplane mode can involve spinning up the rotors with RPM increasing from 0% to 100% with collective angle being at or near 0 degrees. In this state, centrifugal force loads on elastomeric bearing assembly 501 is high and as a result, the bearing friction clutch is locked and prevents rotation of the clutched components. Helicopter mode flight and airplane mode flight is conducted at the 100% RPM. Next, in preparation for operation in the jet mode, the blades are feathered to a top left point 702 of the curve 700. Next, the blades are further feathered from a lower number of degrees to a higher number of degrees, as represented by movement along curve 700 to point 704. With further feathering of blades into the free stream of air, RPM continues to drop, thereby reducing centrifugal force until the bearing friction clutch allows slippage, for example, at point 706. In this state, elastomeric bearing assembly 501 is not loaded with centrifugal force exposure so the rotors can be stopped and blades can be folded aft to begin operation in jet mode.

Still referring to FIG. 7, to transition from jet mode to airplane mode and with operation now at point 704, the blades can be feathered from about 85 degrees to about 20 degrees, following curve 700 to point 702. As the blade feathering is decreased, RPM is continually rising, thereby increasing the centrifugal force load on the elastomeric bearing assembly 501. At point 708, the bearing friction clutch components can engage and prevent relative rotation between the components. The unfeathering of the blades causes progression along curve 700 to point 702 with the rotorcraft 100 transitioning from jet mode to airplane mode where rotors are again providing thrust. In this state, airplane mode and optionally helicopter mode operation can proceed at 100% RPM. Eventually, to conduct a landing, the blades are unfeathered back to 0 degrees and the rotorcraft 100 is landed, thereby spinning down the rotors, dropping RPM, and reducing centrifugal force applied to elastomeric bearing assembly 501 so that the bearing friction clutch components again allow slippage.

Figure 8:
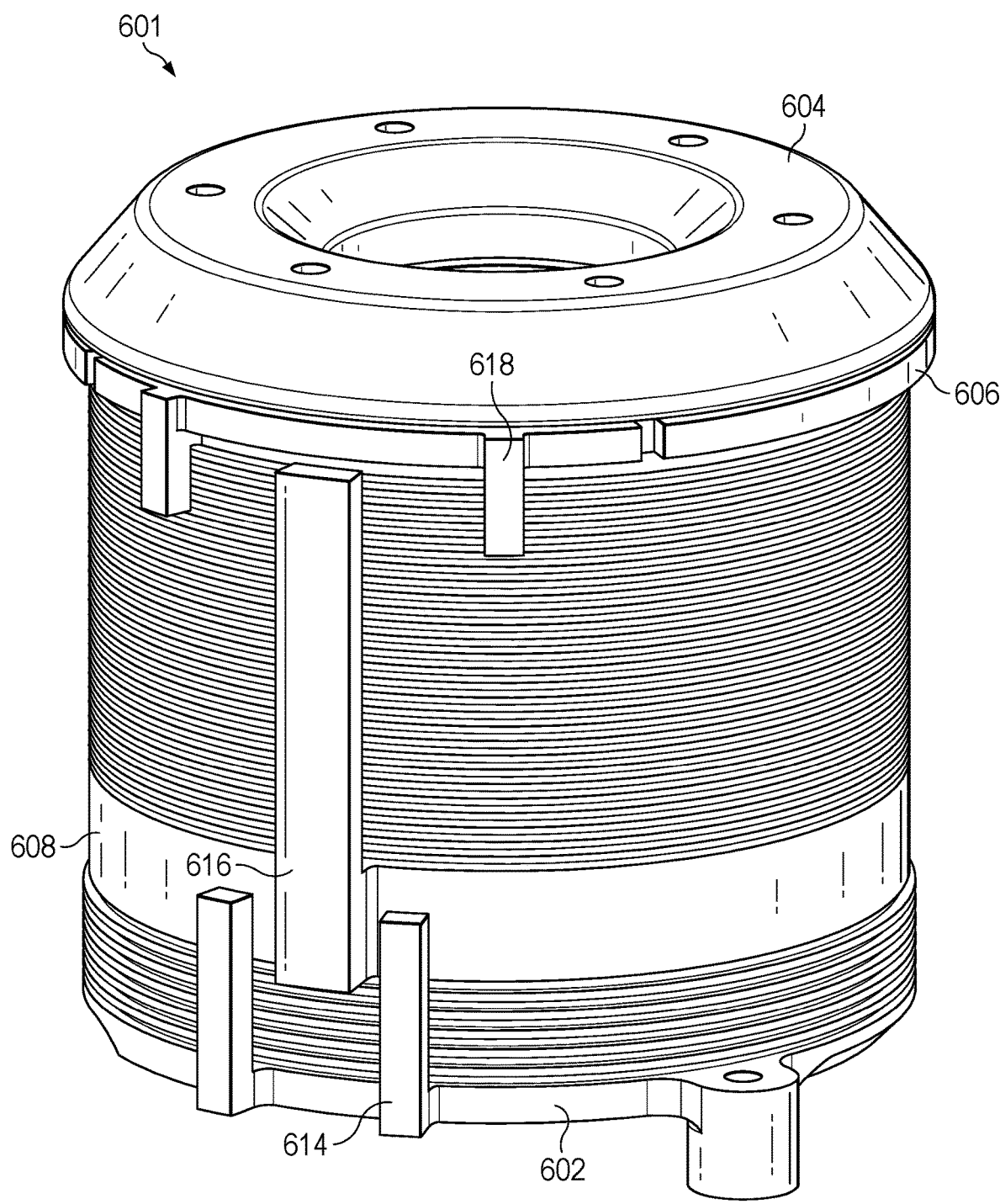
FIG. 8 is a side view of an elastomeric bearing of according to another embodiment in an unengaged configuration.
Figure 9:
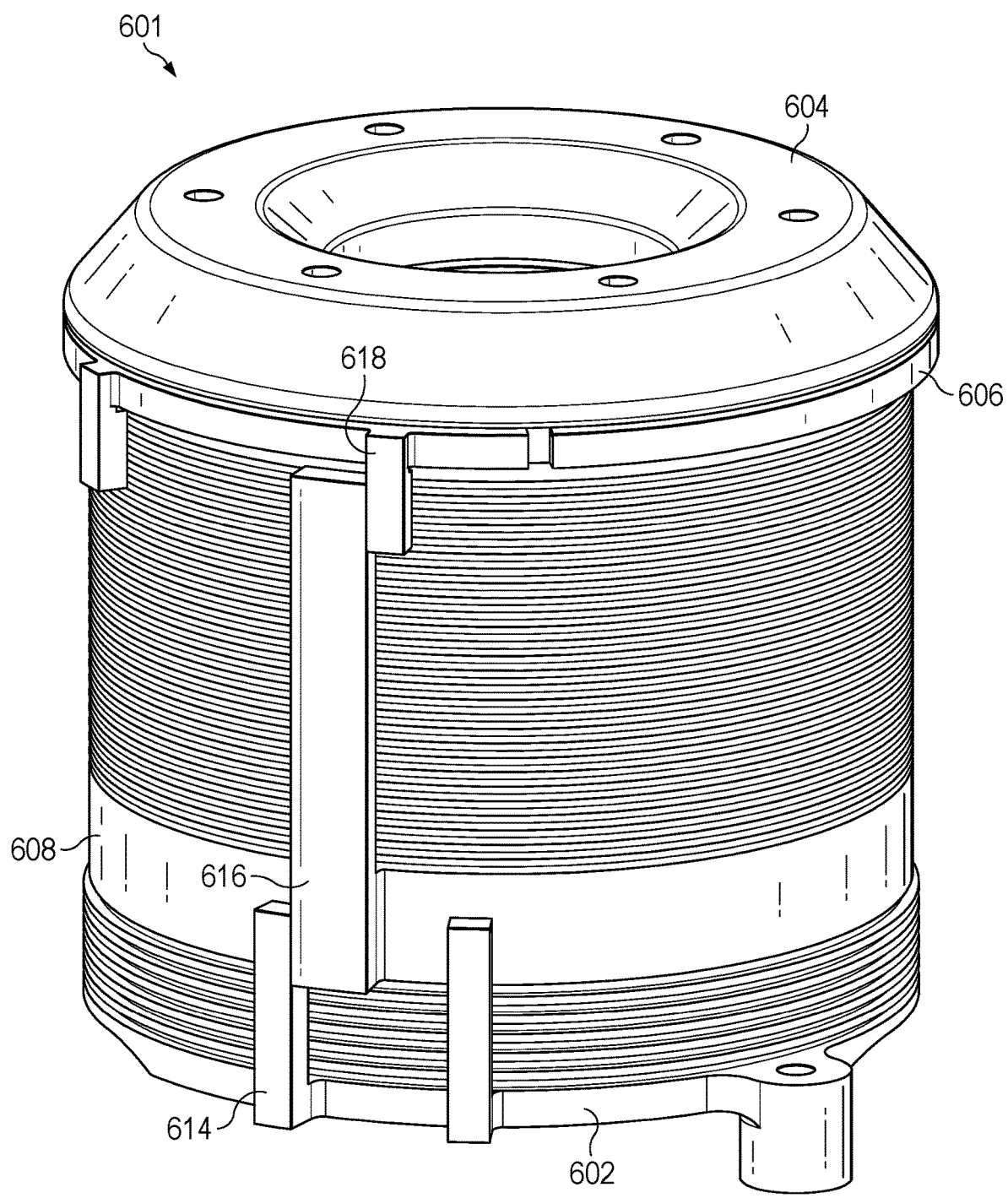
FIG. 9 is a side view of the elastomeric bearing of FIG. 8 in a clockwise engaged configuration.
Figure 10:
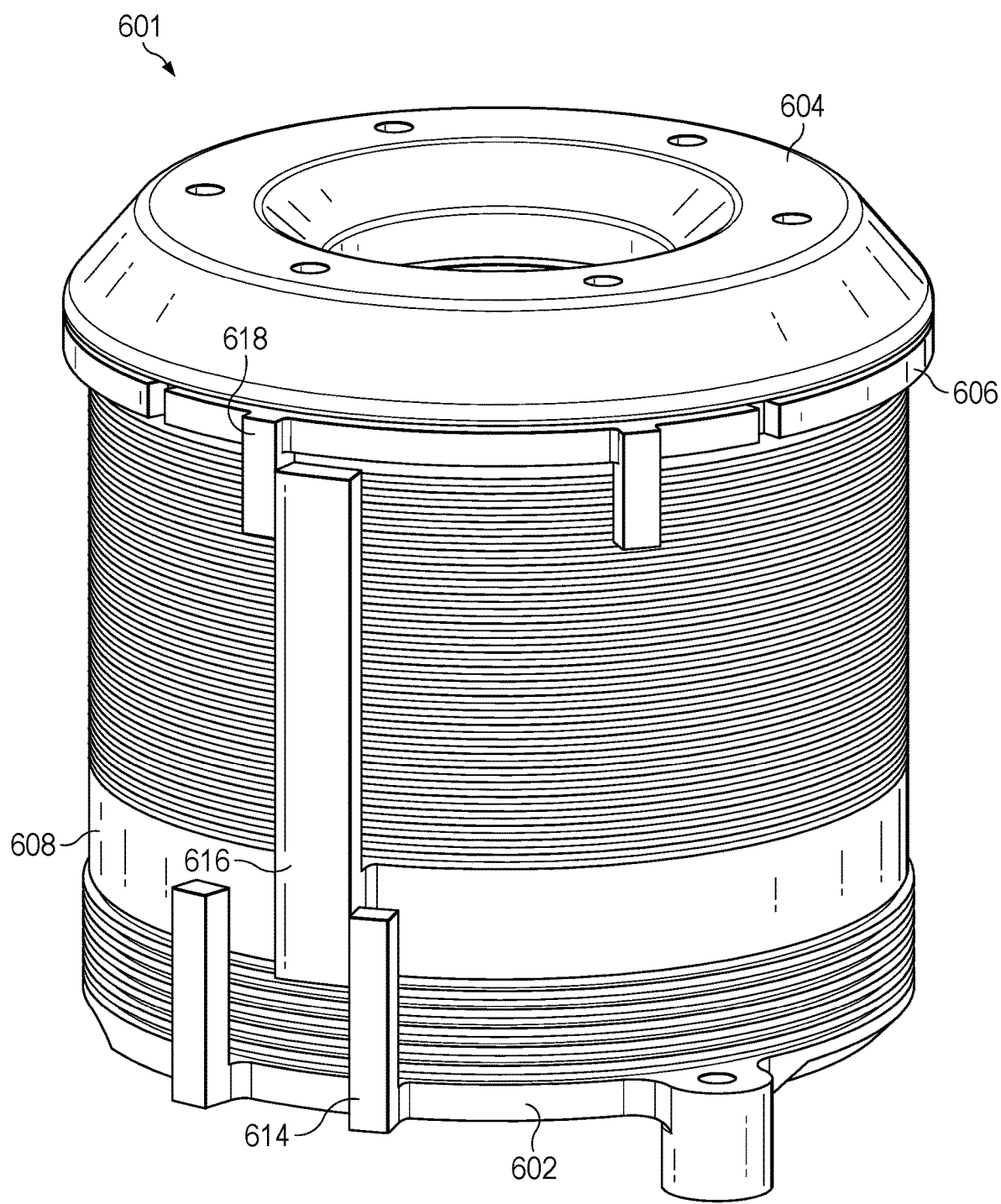
FIG. 10 is a side view of the elastomeric bearing of FIG. 8 in a counter-clockwise engaged configuration.

Referring now to FIGS. 8-10, bearing 601 comprises an inboard interface 602 configured for being fixed to housing 230. Bearing 601 further comprise an outboard interface 604 that remains fixed in angular position relative to the inboard interface 602. Adjacent to the outboard interface 604 is a clutch component 606 configured to selectively rotate relative to the outboard interface 604. The interfacing surfaces of the outboard interface 604 and the clutch component 606 are complementary and configured to enable low friction relative rotation of the clutch component 606 relative to the outboard interface 604. The bearing 601 further comprises an activation element 608 and shims. The activation element 608 is connected to the inboard interface 602 by a stack of the shims and elastomeric elements. Similarly, the activation element 608 is connected to the clutch component 606 by a stack of shims and elastomeric element.

In this embodiment, inboard interface 602 carries longitudinally extending tabs 614 and activation element 608 carries longitudinally and radially extending stops 616. The tabs 614 extend longitudinally so that they are disposed angularly between adjacent stops 616. Unlike bearing 501, shims that are disposed between the clutch component 606 and the activation element 608 do not comprise teeth. Instead, the stops 616 extend longitudinally across the entire stack of shims and elastomeric element between the activation element 608 and the clutch component 606. Clutch component 606 comprises clutch teeth 618 that longitudinally overlap the stops 616.

In operation, with the bearing 601 in significant compression, and assuming a substantially evenly distributed amount of torsional deflection of each elastomeric element, the inboard interface 602, the activation element 608, and the shims can all rotate together in response to torque applied to the bearing 601. However, after sufficient torsional loading of the bearing, the inboard interface 602 and the activation element 608 can begin to rotate at different rates.

Accordingly, the tabs 614 can begin to angularly approach and eventually contact adjacent stops 616 of the activation element 608. With continued torsional loading, any further angular rotation of the inboard interface 602 becomes lockstep with the activation element 608 since the tabs 614 are in contact with and forcing rotation of the stops 616 of the activation element.

With continued rotation of the inboard interface 602 and activation element 608 engages clutch teeth 618 to form a rigid torsional force path between the inboard interface 602 and the clutch component 606, thereby forcing rotation of the clutch component 606 relative to the angularly fixed outboard element 604. Notably, the angular offsets between angular engagements of the various elements is selected so that a rigid torsional force path is obtained to force clutching movement prior to loading the elastomeric elements in a manner that can cause damage.

The above-described action of selectively creating a rigid torsional force path between the inboard interface 602 and the clutch component 606 can ensure that the clutching action is utilized while keeping the elastomeric components within safe operating ranges. In some embodiments, characteristics of the elastomeric elements between the inboard interface 602 and the activation element 608 are different from the characteristics of the elastomeric elements between the activation element 608 and the clutch component 606. Benefits of this arrangement include allowing for longitudinally shorter bearing length as compared to conventional approached and further provides for a tiered force profile. It will be appreciated that in alternative embodiments, bearings can be substantially similar to bearing 601 but comprise no activation element 608. In such embodiments, all shims can be cylindrical shims while still allowing inboard interface type elements to clutch component, thereby causing the friction clutch to actuate.

Most generally, some embodiments disclosed herein repeatedly open up windows of angular operation, for example, such that if a clutched bearing of this disclosure allow for +/−30 degrees of angular displacement, spinning up the rotor would cause successive engagement of activation elements to cause clutch slippage, each time opening a new window of angular displacement without overloading the bearing elastomeric element.

Figure 11:
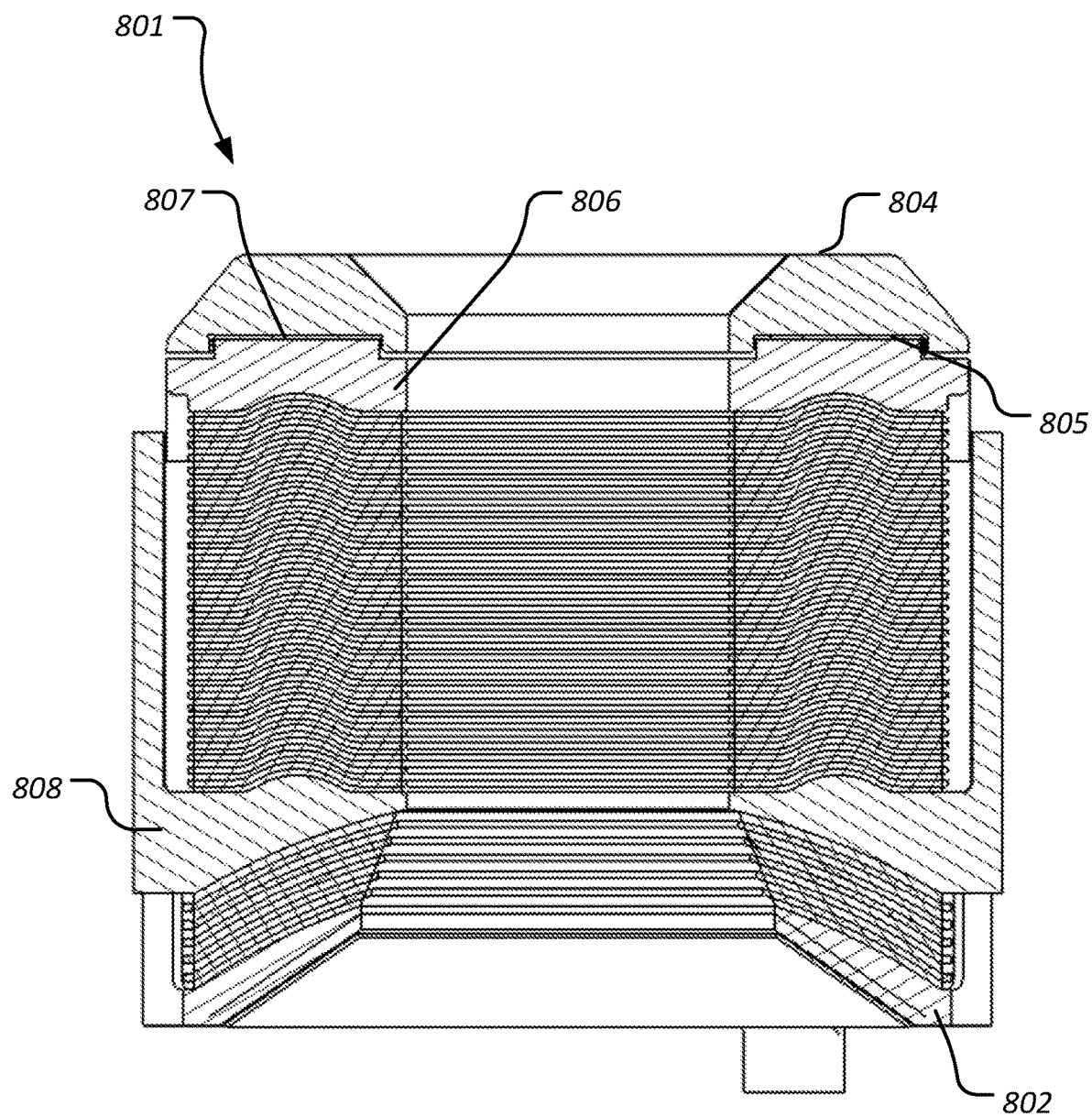
FIG. 11 is a cross-sectional view of an elastomeric bearing according to an embodiment of this disclosure.

Referring now to FIG. 11, a bearing 801 substantially similar to bearing 601 comprises an inboard interface 802 configured for being fixed to a housing substantially similar to housing 230. Bearing 801 further comprise an outboard interface 804 that remains fixed in angular position relative to the inboard interface 802. Adjacent to the outboard interface 804 is a clutch component 806 configured to selectively rotate relative to the outboard interface 804. Outboard clutching interface surface 805 of the outboard interface 804 and inboard clutching interface surface 807 of the clutch component 806 are complementary and configured to enable low friction relative rotation of the clutch component 806. It will further be appreciated that, in some embodiments, one or more of the selectively clutched surfaces, outboard clutching interface surface 805 and inboard clutching interface surface 807, can be coated with one or more of polytetrafluoroethylene or other friction reducing coatings. Further, such surfaces can be additionally provided with grease or other post application lubricants. In some cases, excess lubricant can be removed from the coatings while some benefits remain from molecular adhesion of the lubricant to the coating, thereby further providing useful friction reduction capability without preventing clutching and stopping relative rotation of elements within a desired range of centrifugal forces.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An elastomeric bearing, comprising:
a first end interface;
a second end interface;
an activation element disposed between the first end interface and the second end interface; and
a clutch component disposed between the activation element and the second end interface;
wherein the clutch component remains in contact with the second end interface to selectively allow rotation of the second end interface relative to the clutch component as a function of centrifugal force applied to the elastomeric bearing.

2. The elastomeric bearing of claim 1, further comprising:
a first stack of shims and elastomeric elements disposed between the first end interface and the activation element; and
a second stack of shims and elastomeric elements disposed between the activation element and the second end interface.

3. The elastomeric bearing of claim 2, further comprising:
a longitudinally extending tab carried by the first end interface and at least partially overlapping a stop carried by the activation element.

4. The elastomeric bearing of claim 3, further comprising:
a tooth activator carried by the activation element and at least partially longitudinally overlaps a portion of the second stack of shims and elastomeric elements.

5. The elastomeric bearing of claim 4, wherein the shims of the second stack of shims comprise teeth that at least partially longitudinally overlaps the teeth of adjacent shims.

6. The elastomeric bearing of claim 5, wherein the clutch component comprises a clutch tooth that at least partially longitudinally overlaps a tooth of an adjacent shim.

7. The elastomeric bearing of claim 6, wherein with sufficient rotation of the first end interface relative to the second end interface, a rigid torsional force path is formed between the first end interface and the clutch component.

8. The elastomeric bearing of claim 7, wherein the clutch component is rotatable relative to the second end interface.

9. The elastomeric bearing of claim 2, further comprising:
a longitudinally extending tab carried by the first end interface and at least partially overlapping a first stop carried by the activation element; and
a second stop carried by the activation element, the second stop extending longitudinally across at least a portion of the second stack of shims and elastomeric elements.

10. The elastomeric bearing of claim 9, further comprising:
a clutch tooth carried by the clutch component, the clutch tooth at least partially longitudinally overlapping the second stop.

11. The elastomeric bearing of claim 10, wherein the clutch tooth extends longitudinally across at least a portion of the second stack of shims and elastomeric elements.

12. The elastomeric bearing of claim 2, wherein the elastomeric elements of the first stack are different than the elastomeric elements of the second stack.

13. A method of operating an elastomeric bearing, comprising:
providing a first end interface;
providing a second end interface;
providing an activation component between the first end interface and the second end interface;
providing a clutch component between the activation component and the second end interface; and
rotating the first end interface relative to the second interface to cause rotation of the clutch component relative to the second end interface;
wherein the clutch component remains in contact with the second end interface to selectively allow rotation of the second end interface relative to the clutch component as a function of centrifugal force applied to the elastomeric bearing.

14. The method of claim 13, wherein a rigid torsional force path is formed between the first end interface and the clutch component.

15. The method of claim 14, wherein the rigid torsional force path comprises shims disposed between the activation element and the clutch component.

16. The method of claim 15, wherein the rigid torsional force path comprises teeth of adjacent shims contacting each other.

17. The method of claim 14, wherein a stop carried by the activation element contacts both a clutch tooth carried by the clutch component and a tab carried by the first end interface.

* * * * *